United States Patent
Kim et al.

(10) Patent No.: US 9,452,673 B2
(45) Date of Patent: Sep. 27, 2016

(54) TRANSMISSION SYSTEM OF HYBRID ELECTRIC VEHICLE

(71) Applicant: Hyundai Motor Company, Seoul (KR)

(72) Inventors: Baekyu Kim, Suwon-si (KR); Chulmin Ahn, Busan (KR); Seok Joon Kim, Yongin-si (KR); SungGon Byun, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/725,296

(22) Filed: May 29, 2015

(65) Prior Publication Data

US 2016/0101679 A1    Apr. 14, 2016

(30) Foreign Application Priority Data

Oct. 14, 2014    (KR) .......................... 10-2014-0138545

(51) Int. Cl.
| | |
|---|---|
| *F16H 57/04* | (2010.01) |
| *B60K 6/365* | (2007.10) |
| *F16H 3/72* | (2006.01) |
| *B60K 6/48* | (2007.10) |

(52) U.S. Cl.
CPC .............. *B60K 6/365* (2013.01); *B60K 6/48* (2013.01); *F16H 3/724* (2013.01); *F16H 57/043* (2013.01); *F16H 57/0421* (2013.01); *F16H 57/0471* (2013.01); *F16H 57/0484* (2013.01); *B60Y 2200/92* (2013.01); *Y10S 903/91* (2013.01)

(58) Field of Classification Search
None
See application file for complete search history.

(56) References Cited

U.S. PATENT DOCUMENTS

| | | | | |
|---|---|---|---|---|
| 4,429,587 A | * | 2/1984 | Finn, III | ............. F16H 57/0047 184/6.12 |
| 6,817,962 B2 | * | 11/2004 | Tanikawa | .............. F16H 57/043 475/159 |
| 6,910,981 B2 | | 6/2005 | Minagawa et al. | |
| 7,189,177 B2 | | 3/2007 | Takasu et al. | |
| 8,092,337 B2 | * | 1/2012 | Tomita | ................... B60K 6/365 475/344 |
| 8,753,243 B2 | * | 6/2014 | McCune | ....................... 475/159 |
| 8,905,885 B2 | * | 12/2014 | Yamamoto | ............. B60K 6/405 180/65.235 |
| 2013/0017916 A1 | * | 1/2013 | Sada | ....................... F16D 41/06 475/5 |

FOREIGN PATENT DOCUMENTS

| | | |
|---|---|---|
| JP | 3496654 B2 | 2/2004 |
| JP | 2004-132440 A | 4/2004 |
| JP | 3867651 B2 | 1/2007 |
| JP | 2011-208758 A | 10/2011 |
| JP | 2012-162144 A | 8/2012 |

* cited by examiner

*Primary Examiner* — Dirk Wright

(74) *Attorney, Agent, or Firm* — Morgan, Lewis & Bockius LLP

(57) ABSTRACT

A transmission system may include a planetary gear set disposed on an input shaft receiving power of an engine, two input gears connected respectively to two rotation elements among three rotation elements of the planetary gear set, first and second motor/generators disposed on an intermediate shaft and a connecting shaft disposed in parallel with the input shaft, two intermediate gears connected respectively to first and second rotors of the first and second motor/generators, a brake selectively connecting the first rotor of the first motor/generator to a transmission housing, and two output gears fixedly disposed on an output shaft disposed in parallel with the intermediate shaft and transmitting power transmitted through one input gear of the two input gears and/or one intermediate gear of the two intermediate gears to a final reduction gear of a differential apparatus.

20 Claims, 3 Drawing Sheets

TRANSMISSION SYSTEM OF HYBRID ELECTRIC VEHICLE

CROSS-REFERENCE TO RELATED APPLICATION

The present application claims priority to and the benefit of Korean Patent Application No. 10-2014-0138545 filed on Oct. 14, 2014, the entire contents of which is incorporated herein for all purposes by this reference.

BACKGROUND OF THE INVENTION

1. Field of the Invention

The present invention relates to a transmission system of a hybrid electric vehicle. More particularly, the present invention relates to a transmission system of a hybrid electric vehicle that can run using electrical continuously variable shifting at electric vehicle (EV) mode and achieve parallel driving.

2. Description of Related Art

Generally, a hybrid electric vehicle is a vehicle which uses two different power sources efficiently.

Such a hybrid electric vehicle typically uses an engine and a motor/generator. The hybrid electric vehicle uses the motor/generator having relatively better low-speed torque characteristics as a main power source at a low-speed and uses an engine having relatively better high-speed torque characteristics as a main power source at a high-speed.

Since the hybrid electric vehicle stops operation of the engine using the fossil fuel and uses the motor/generator at a low-speed region, fuel consumption may be improved and exhaust gas may be reduced.

The power transmission system of a hybrid electric vehicle is classified into a single-mode type and a multi-mode type.

A torque delivery apparatus such as clutches and brakes for shift control is not necessary, but fuel consumption is high due to deterioration of efficiency at a high-speed region and an additional torque multiplication device is required for being applied to a large vehicle according to the single-mode type.

Since the multi-mode type has high efficiency at the high-speed region and is able to multiply torque autonomously, the multi-mode type can be applied to a full size vehicle.

Therefore, the multi-mode type instead of the single-mode type is applied as the power transmission system of a hybrid electric vehicle and is also under continuous investigation.

The power transmission system of the multi-mode type includes a plurality of planetary gear sets, a plurality of motor/generators operated as a motor and/or a generator, a plurality of torque delivery apparatus controlling rotation elements of the planetary gear sets, and a battery used as a power source of the motor/generators.

The power transmission system of the multi-mode type has different operating mechanisms depend on connections of the planetary gear sets, the motor/generators, and the torque delivery apparatus.

In addition, the power transmission system of the multi-mode type has different features such a durability, power delivery efficiency, and size depend on the connections of the planetary gear sets, the motor/generators, and the torque delivery apparatus. Therefore, designs for the connection structure of the power transmission system of a hybrid electric vehicle are also under continuous investigation to achieve robust and compact power transmission system having no power loss.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a transmission system of a hybrid electric vehicle having advantages of lubricating a planetary gear set without using an additional hydraulic pump by disposing a tank for collecting churning oil above the planetary gear set in a transmission housing.

Another embodiment of the present invention provides a transmission system of a hybrid electric vehicle that can lubricate an intermediate shaft bearing using the churning oil by forming a hydraulic line connected from the tank to the intermediate shaft bearing at a front cover.

A transmission system of a hybrid electric vehicle according to an exemplary embodiment of the present invention may include: a planetary gear set disposed on an input shaft receiving power of an engine, two input gears connected respectively to two rotation elements among three rotation elements of the planetary gear set, first and second motor/generators disposed on an intermediate shaft and a connecting shaft disposed in parallel with the input shaft, two intermediate gears connected respectively to first and second rotors of the first and second motor/generators, a brake selectively connecting the first rotor of the first motor/generator to a transmission housing, and two output gears fixedly disposed on an output shaft disposed in parallel with the intermediate shaft and transmitting power transmitted through one input gear of the two input gears and/or one intermediate gear of the two intermediate gears to a final reduction gear of a differential apparatus.

A tank for collecting churning oil may be disposed above the planetary gear set in the transmission housing, and a first hydraulic line may be formed at a ring gear of the planetary gear set so as to supply lubrication oil from the tank into the planetary gear set.

The first hydraulic line may be formed at an exterior circumference of the ring gear between two ring gear bearings rotatably supporting an exterior circumference of an end portion and an interior circumference of the other end portion of the ring gear on the transmission housing.

A second hydraulic line may be formed at the transmission housing and be connected from the tank to an input shaft hydraulic line formed in the input shaft through a rear end portion of the input shaft.

An input shaft bearing for rotatably supporting the rear end portion of the input shaft on the transmission housing may be fluidly blocked from the second hydraulic line by a labyrinth seal interposed between the rear end portion of the input shaft and the transmission housing.

A third hydraulic line for supplying lubrication oil to an intermediate shaft bearing rotatably supporting a front end portion of the intermediate shaft may be formed at a front cover coupled to a front end portion of the transmission housing.

The third hydraulic line may be formed at a position of the front cover corresponding to the intermediate shaft bearing rotatably supporting the front end portion of the intermediate shaft on the front cover.

The brake may be disposed between a first hub connected to the first rotor of the first motor/generator and the transmission housing in a space in the transmission housing corresponding to an interior circumference of a first stator of the first motor/generator.

A parking gear may be fixedly disposed on the intermediate shaft.

The planetary gear set, the two input gears and the two intermediate gears, the first motor/generator, and the second motor/generator may be sequentially disposed from the engine rearward.

The second motor/generator may be disposed at the rearmost in the transmission housing, the connecting shaft having an intermediate shaft hydraulic line formed therein may be splined between a second hub connected to the second rotor and a rear end portion of the intermediate shaft, and lubrication oil may be supplied to the first motor/generator through the intermediate shaft hydraulic line of the connecting shaft by centrifugal force.

A first hub connected to the first rotor of the first motor/generator may be rotatably disposed on the connecting shaft.

A transmission system of a hybrid electric vehicle according to another exemplary embodiment of the present invention may include: a planetary gear set disposed on an input shaft receiving power of an engine and connected to the input shaft through a planet carrier, first and second input gears connected respectively to a sun gear and a ring gear of the planetary gear set, first and second motor/generators disposed on an intermediate shaft and a connecting shaft disposed in parallel with the input shaft, first and second intermediate gears connected respectively to first and second rotors of the first and second motor/generators, a brake selectively connecting the first rotor of the first motor/generator to a transmission housing, and first and second output gears fixedly disposed on an output shaft disposed in parallel with the intermediate shaft and transmitting power transmitted through the second input gear and/or the second intermediate gear to a final reduction gear of a differential apparatus.

A tank for collecting churning oil may be disposed above the planetary gear set in the transmission housing, and a first hydraulic line may be formed at a ring gear of the planetary gear set so as to supply lubrication oil from the tank into the planetary gear set.

A second hydraulic line may be formed at the transmission housing and be connected from the tank to an input shaft hydraulic line formed in the input shaft through a rear end portion of the input shaft.

A third hydraulic line for supplying lubrication oil to an intermediate shaft bearing rotatably supporting a front end portion of the intermediate shaft may be formed at a front cover coupled to a front end portion of the transmission housing.

The first hydraulic line may be formed at an exterior circumference of the ring gear between two ring gear bearings rotatably supporting an exterior circumference of an end portion and an interior circumference of the other end portion of the ring gear on the transmission housing.

An input shaft bearing for rotatably supporting the rear end portion of the input shaft on the transmission housing may be fluidly blocked from the second hydraulic line by a labyrinth seal interposed between the rear end portion of the input shaft and the transmission housing.

The third hydraulic line may be formed at a position of the front cover corresponding to the intermediate shaft bearing rotatably supporting the front end portion of the intermediate shaft on the front cover.

The brake may be disposed between a first hub connected to the first rotor of the first motor/generator and the transmission housing in a space in the transmission housing corresponding to an interior circumference of a first stator of the first motor/generator.

A parking gear may be fixedly disposed on the intermediate shaft.

The planetary gear set, the two input gears and the two intermediate gears, the first motor/generator, and the second motor/generator may be sequentially disposed from the engine rearward.

The second motor/generator may be disposed at the rearmost in the transmission housing, the connecting shaft having an intermediate shaft hydraulic line formed therein may be splined between a second hub connected to the second rotor and a rear end portion of the intermediate shaft, and lubrication oil may be supplied to the first motor/generator through the intermediate shaft hydraulic line of the connecting shaft by centrifugal force.

A first hub connected to the first rotor of the first motor/generator may be rotatably disposed on the connecting shaft.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
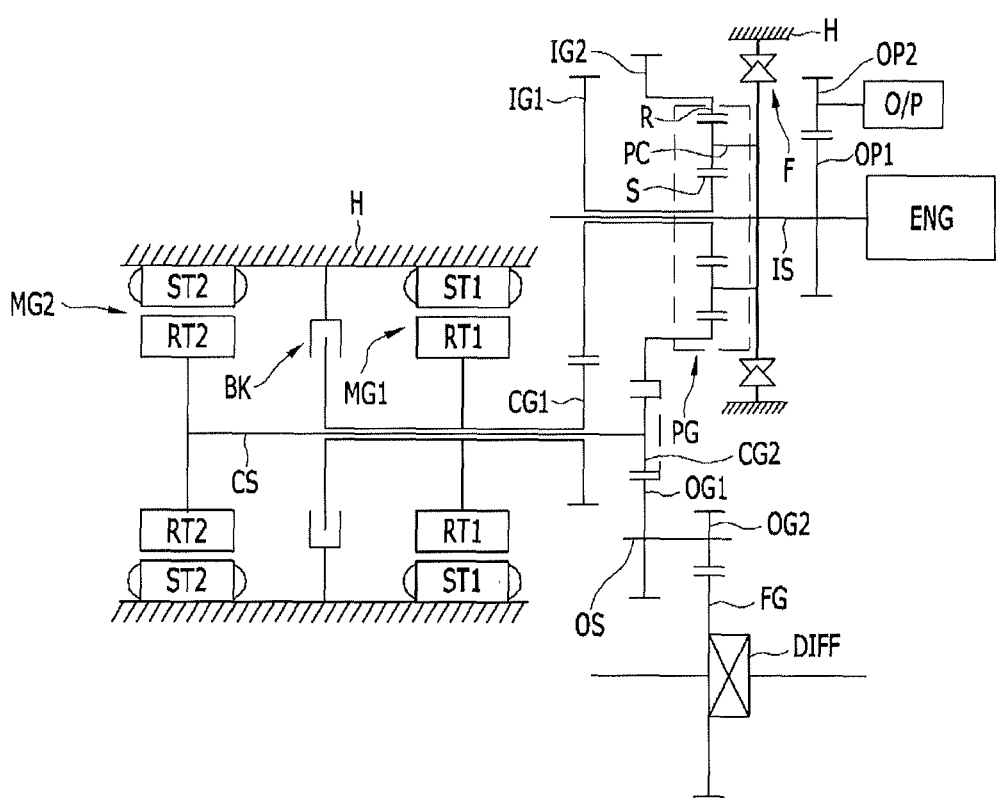
FIG. 1 is a schematic diagram of a transmission system of a hybrid electric vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a transmission system of a hybrid electric vehicle according to an exemplary embodiment of the present invention.

Referring to FIG. 1, a transmission system of a hybrid electric vehicle according to an exemplary embodiment of the present invention uses an engine ENG and first and second motor/generators MG1 and MG2 as power sources, and includes an input shaft IS, a planetary gear set PG, first and second input gears IG1 and IG2, an intermediate shaft CS, first and second intermediate gears CG1 and CG2, a brake BK, an output shaft OS, first and second output gears OG1 and OG2, and a final reduction module.

The engine ENG is a main power source, and a gasoline engine or a diesel engine using conventional fossil fuel may be used as the engine.

Power generated by the engine ENG is transmitted to a transmission side through input means, and the input device may be connected to an output side of the engine ENG through a damper and/or a clutch or be connected to the output side of the engine ENG directly without interposing the damper and/or the clutch therebetween.

The planetary gear set PG, two input gears IG1 and IG2 and two intermediate gears CG1 and CG2, the first motor/generator MG1, and the second motor/generator MG2 are sequentially disposed from the engine rearward.

An input shaft hydraulic line ISL (please refer to FIG. 2 and FIG. 3) is formed in the input shaft IS, and the input shaft IS is operably connected to the engine ENG so as to receive the power of the engine ENG.

The planetary gear set PG is a single pinion planetary gear set, and includes a sun gear S, a ring gear R, and a planet carrier PC rotatably supporting a plurality of pinions engaging with the sun gear S and the ring gear R.

The sun gear S is directly connected to the first input gear IG1, the planet carrier PC is directly connected to the input shaft IS, and the ring gear R is directly connected to the second input gear IG2.

In addition, the planet carrier PC as well as the input shaft IS is connected to a transmission housing H through a one-way clutch F and is prevented from rotating in one direction.

Figure 2:
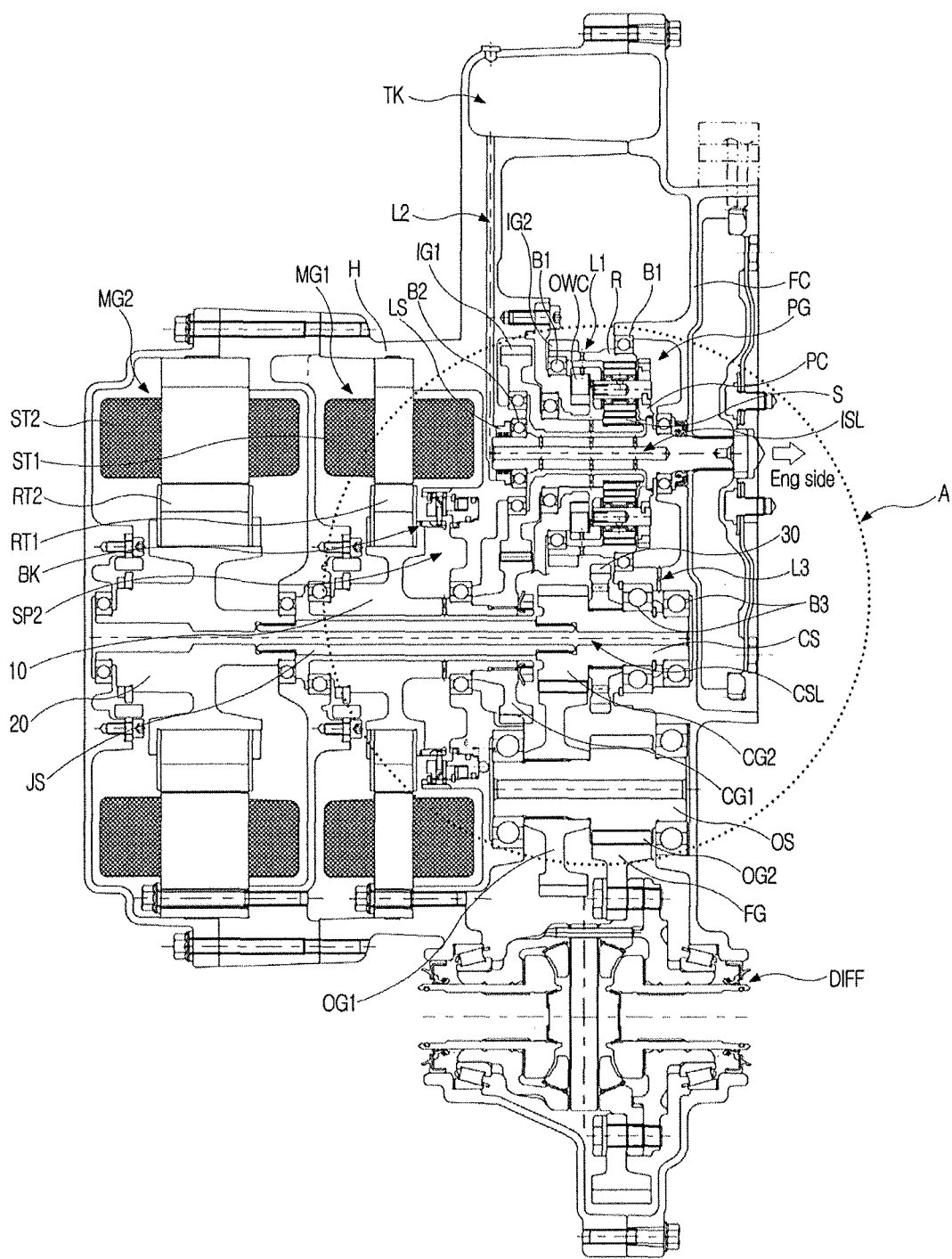
FIG. 2 is a cross-sectional view of a transmission system of a hybrid electric vehicle according to an exemplary embodiment of the present invention.
Figure 3:
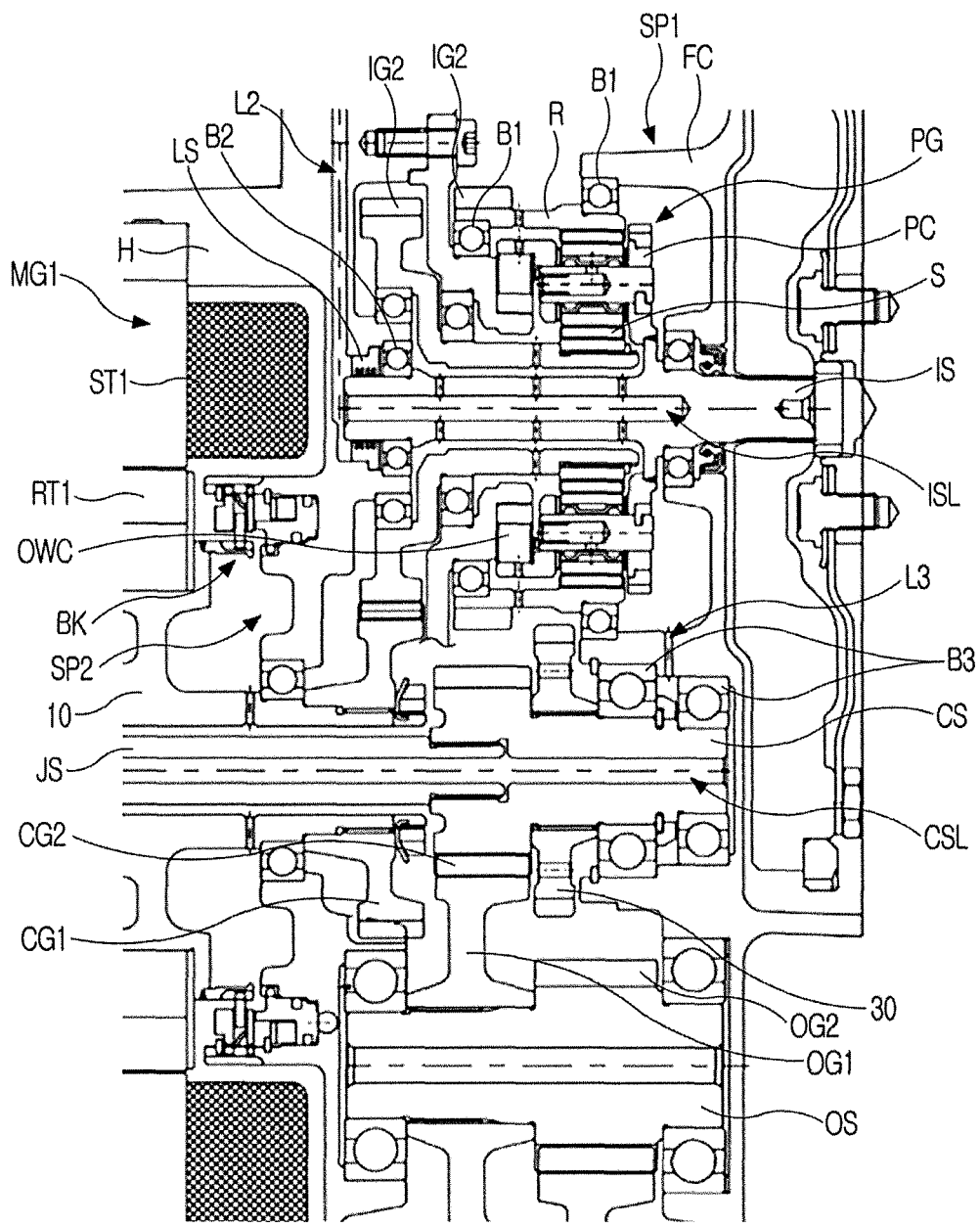
FIG. 3 is an enlarged cross-sectional view of A portion in FIG. 2.

The intermediate shaft CS is disposed apart from and in parallel with the input shaft IS, and the first and second motor/generators MG1 and MG2 are disposed on the intermediate shaft CS and a connecting shaft JS concentrically connected thereto (please refer to FIG. 2 and FIG. 3).

The first motor/generator MG1 includes a first stator ST1 fixed to the transmission housing H and a first rotor RT1 rotatably supported at a radial inside of the first stator ST1.

In addition, the first rotor RT1 is connected to the first intermediate gear CG1 through a first hub 10, and the first intermediate gear CG1 is engaged with the first input gear IG1 (please refer to FIG. 2 and FIG. 3).

The first motor/generator MG1 can operate as a generator by the power of the engine ENG input through the first input gear IG1. Electrical energy generated by the first motor/generator MG1 is charged into a battery or is supplied to the second motor/generator MG2.

In addition, when the vehicle drives with high speed or the engine is started, the first motor/generator MG1 can operate as a motor outputting inverse driving torque.

The second motor/generator MG2 includes a second stator ST2 fixed to the transmission housing H and a second rotor RT2 rotatably supported at a radial inside of the second stator ST2.

Herein, since the second motor/generator MG2 is disposed at the rearmost in the transmission housing H, the hollow connecting shaft JS is splined to a second hub 20 connected to the second rotor RT2 and a rear end portion of the intermediate shaft CS. An intermediate shaft hydraulic line CSL is formed in the second hub 20, the connecting shaft JS, and the intermediate shaft CS. Lubrication oil may be supplied to the first motor/generator MG1 through the intermediate shaft hydraulic line CSL of the connecting shaft JS by centrifugal force (please refer to FIG. 2).

The second hub 20 connected to the second rotor RT2 of the second motor/generator MG2 is connected to the second intermediate gear CG2 formed on the intermediate shaft CS through the connecting shaft JS.

At this time, the first hub 10 connected to the first rotor RT1 of the first motor/generator MG1 is rotatably disposed on the connecting shaft JS.

The second motor/generator MG2 can mainly operate as a motor assisting driving torque for driving the vehicle, and can operate as a generator converting inertial energy into electrical energy when vehicle decelerates.

In addition, the brake BK is configured to selectively connect the first rotor RT1 of the first motor/generator MG1 to the transmission housing H.

The brake BK operates at engine coupling (overdrive) mode when the sun gear S of the planetary gear set PG is operated as a fixed element.

The brake BK may be a conventional multi-plate friction element that is operated by hydraulic pressure, and may be controlled by hydraulic control system.

In addition, the output shaft OS is disposed apart from and in parallel with the input shaft IS and the intermediate shaft CS. The first output gear OG1 and the second output gear OG2 are fixedly disposed respectively on both end portions of the output shaft OS.

The first output gear OG1 is engaged with the second input gear IG2 and the second intermediate gear CG2, and the second output gear OG2 is operably connected to the final reduction module.

The final reduction module includes a differential apparatus DIFF and a final reduction gear FG, and the final reduction gear FG is engaged with the second output gear OG2 so as to finally decelerate power transmitted from the output shaft OS and transmit the decelerated power to a driving wheel through the differential apparatus DIFF.

A non-explained symbol O/P in FIG. 1 denotes a hydraulic pump, and the hydraulic pump receives the power of the input shaft IS and generates hydraulic pressure demanded by the transmission through a hydraulic pump drive gear OP1 disposed on the input shaft IS and a hydraulic pump driven gear OP2 engaged thereto.

The transmission system of a hybrid electric vehicle can achieve electric vehicle (EV) mode, power split mode, and engine coupling (OD) mode.

In a state that the engine ENG is stopped, driving torque of the second motor/generator MG2 is transmitted to the final reduction gear FG of the differential apparatus DIFF through the intermediate shaft CS, the second intermediate gear CG2, the first output gear OG1, the output shaft OS, and the second output gear OG2 at the EV mode.

At this time, electric continuously variable shifting may be achieved by controlling rotation speed of the second motor/generator MG2.

In addition, the power of the engine ENG is transmitted as driving torque for driving the vehicle and as driving torque for generating electricity at the first motor/generator MG1, and power of the second motor/generator MG2 is used as auxiliary power at the power split mode.

That is, the engine ENG is started by the first motor/generator MG1 and the power of the engine ENG is split at the planetary gear set PG. A portion of the power of the engine ENG is transmitted to the driving wheel through the second input gear IG2, the first output gear OG1, the output shaft OS, the second output gear OG2, and the final reduction gear FG of the differential apparatus DIFF, and the other portion of the power of the engine ENG is transmitted to the first motor/generator MG1 through the first input gear IG1 and the first intermediate gear CG1 as driving torque for generating electricity.

Electrical energy generated by the first motor/generator MG1 is used to operate the second motor/generator MG2 or is charged into the battery.

In addition, power of the second motor/generator MG2 that is used as auxiliary power is transmitted to the driving wheel through the intermediate shaft CS, the second intermediate gear CG2, the first output gear OG1, the output shaft OS, the second output gear OG2, and the final reduction gear FG of the differential apparatus DIFF.

In addition, the brake BK is operated and the sun gear S of the planetary gear set PG is operated as the fixed element at the engine coupling (OD) mode.

In this case, rotation speed of the engine ENG is increased by the planetary gear set PG and the increased rotation speed is transmitted to the driving wheel through the second input gear IG2, the first output gear OG1, the output shaft OS, the second output gear OG2, and the final reduction gear FG of the differential apparatus DIFF.

In addition, power of the second motor/generator MG2 that is used as auxiliary power is transmitted to the driving wheel through the intermediate shaft CS, the second intermediate gear CG2, the first output gear OG1, the output shaft OS, the second output gear OG2, and the final reduction gear FG of the differential apparatus DIFF.

Hereinafter, the transmission system of a hybrid electric vehicle will be described in further detail.

FIG. 2 is a cross-sectional view of a transmission system of a hybrid electric vehicle according to an exemplary embodiment of the present invention, and FIG. 3 is an enlarged cross-sectional view of A portion in FIG. 2.

Referring to FIG. 2 and FIG. 3, a tank TK for collecting churning oil is disposed above the planetary gear set PG in the transmission housing H.

The tank TK is connected to a space SP1 in the transmission housing H, and a first hydraulic line L1 is formed at the ring gear R of the planetary gear set PG exposed to the space SP1. Therefore, lubrication oil supplied from the tank TK to the first hydraulic line L1 through the space SP1 by gravity is used to lubricate an inside of the planetary gear set PG.

At this time, the first hydraulic line L1 is formed at an exterior circumference of the ring gear R between two ring gear bearings B1 rotatably supporting an exterior circumference of an end portion of the ring gear R and an interior circumference of the other end portion of the ring gear R on the transmission housing H.

In addition, a second hydraulic line L2 is formed at the transmission housing H and is connected from the tank TK to the input shaft hydraulic line ISL through a rear end portion of the input shaft IS.

At this time, an input shaft bearing B2 for rotatably supporting the rear end portion of the input shaft IS on the transmission housing H is fluidly blocked from the second hydraulic line L2 by a labyrinth seal LS interposed between the rear end portion of the input shaft IS and the transmission housing H.

That is, the labyrinth seal LS prevents lubrication oil supplied from the tank TK to the input shaft hydraulic line ISL through the second hydraulic line L2 from flowing toward the planetary gear set PG through the input shaft bearing B2.

In addition, a third hydraulic line L3 is formed at a front cover FC fixed to a front end portion of the transmission housing H. The third hydraulic line L3 is configured to supply lubrication oil to two intermediate shaft bearings B3 rotatably supporting a front end portion of the intermediate shaft CS.

That is, in order to supply lubrication oil received from the tank TK to the two intermediate shaft bearings B3, the third hydraulic line L3 is formed at the front cover FC corresponding to a position between the two intermediate shaft bearings B3 rotatably supporting the front end portion of the intermediate shaft CS on the front cover FC.

In addition, the brake BK is disposed in a space SP2 in the transmission housing H corresponding to an interior circumference of the first stator ST1 of the first motor/generator MG2. Particularly, the brake BK is disposed between the first hub 10 connected to the first rotor RT1 of the first motor/generator MG1 and the transmission housing H. Therefore, a supply length of hydraulic pressure to the brake BK may be minimized.

In addition, a parking gear 30 is fixedly disposed on the intermediate shaft CS.

Since the tank TK for collecting churning oil is disposed above the planetary gear set PG in the transmission housing H, the transmission system of a hybrid electric vehicle according to an exemplary embodiment of the present invention can lubricate the planetary gear set PG smoothly without using an additional hydraulic pump.

In addition, since leakage of lubrication oil supplied from the tank TK to the input shaft hydraulic line ISL through the second hydraulic line L2 is prevented by the labyrinth seal LS, oil supply efficiency may be enhanced.

In addition, since the hydraulic line connected from the tank TK to the intermediate shaft bearing B3 is formed at the front cover FC, the intermediate shaft bearing B3 can be lubricated by the churning oil.

Since the second motor/generator MG2 is disposed at the rearmost in the transmission housing H, the intermediate shaft hydraulic line CSL may be formed on interior circumferences of the intermediate shaft CS and the connecting shaft JS. Therefore, lubrication oil can be supplied by centrifugal force.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission system of a hybrid electric vehicle comprising:
   a planetary gear set disposed on an input shaft receiving power of an engine;
   two input gears connected respectively to two rotation elements among three rotation elements of the planetary gear set;
   first and second motor/generators disposed on an intermediate shaft and a connecting shaft disposed in parallel with the input shaft;
   two intermediate gears connected respectively to first and second rotors of the first and second motor/generators;
   a brake selectively connecting the first rotor of the first motor/generator to a transmission housing; and
   two output gears fixedly disposed on an output shaft disposed in parallel with the intermediate shaft and transmitting power transmitted through one input gear of the two input gears and/or one intermediate gear of the two intermediate gears to a final reduction gear of a differential apparatus,
   wherein a tank for collecting churning oil is disposed above the planetary gear set in the transmission housing, and a first hydraulic line is formed at a ring gear of the planetary gear set and is configured to supply lubrication oil from the tank into the planetary gear set.

2. The transmission system of claim 1, wherein the first hydraulic line is formed at an exterior circumference of the ring gear between two ring gear bearings rotatably supporting an exterior circumference of a first end portion and an interior circumference of a second end portion of the ring gear on the transmission housing.

3. The transmission system of claim 1, wherein a second hydraulic line is formed at the transmission housing and is connected from the tank to an input shaft hydraulic line formed in the input shaft through a rear end portion of the input shaft.

4. The transmission system of claim 3, wherein an input shaft bearing for rotatably supporting the rear end portion of the input shaft on the transmission housing is fluidly blocked from the second hydraulic line by a labyrinth seal interposed between the rear end portion of the input shaft and the transmission housing.

5. The power transmission system of claim 1, wherein a third hydraulic line for supplying lubrication oil to an intermediate shaft bearing rotatably supporting a front end portion of the intermediate shaft is formed at a front cover coupled to a front end portion of the transmission housing.

6. The transmission system of claim 5, wherein the third hydraulic line is formed at a position of the front cover corresponding to the intermediate shaft bearing rotatably supporting the front end portion of the intermediate shaft on the front cover.

7. The transmission system of claim 1, wherein the brake is disposed between a first hub connected to the first rotor of the first motor/generator and the transmission housing in a space in the transmission housing corresponding to an interior circumference of a first stator of the first motor/generator.

8. The transmission system of claim 1, wherein a parking gear is fixedly disposed on the intermediate shaft.

9. The transmission system of claim 1, wherein the planetary gear set, the two input gears and the two intermediate gears, the first motor/generator, and the second motor/generator are sequentially disposed from the engine rearward.

10. The transmission system of claim 1, wherein the second motor/generator is disposed at the rearmost in the transmission housing, the connecting shaft having an intermediate shaft hydraulic line formed therein is splined between a second hub connected to the second rotor and a rear end portion of the intermediate shaft, and lubrication oil is supplied to the first motor/generator through the intermediate shaft hydraulic line of the connecting shaft by centrifugal force.

11. The transmission system of claim 10, wherein a first hub connected to the first rotor of the first motor/generator is rotatably disposed on the connecting shaft.

12. A transmission system of a hybrid electric vehicle comprising:
    a planetary gear set disposed on an input shaft receiving power of an engine and connected to the input shaft through a planet carrier;
    first and second input gears connected respectively to a sun gear and a ring gear of the planetary gear set;
    first and second motor/generators disposed on an intermediate shaft and a connecting shaft disposed in parallel with the input shaft;
    first and second intermediate gears connected respectively to first and second rotors of the first and second motor/generators;
    a brake selectively connecting the first rotor of the first motor/generator to a transmission housing; and
    first and second output gears fixedly disposed on an output shaft disposed in parallel with the intermediate shaft and transmitting power transmitted through the second input gear and/or the second intermediate gear to a final reduction gear of a differential apparatus,
    wherein a tank for collecting churning oil is disposed above the planetary gear set in the transmission housing, and a first hydraulic line is formed at the ring gear of the planetary gear set and configured to supply lubrication oil from the tank into the planetary gear set,
    wherein a second hydraulic line is formed at the transmission housing and is connected from the tank to an input shaft hydraulic line formed in the input shaft through a rear end portion of the input shaft, and
    wherein a third hydraulic line for supplying lubrication oil to an intermediate shaft bearing rotatably supporting a front end portion of the intermediate shaft is formed at a front cover coupled to a front end portion of the transmission housing.

13. The transmission system of claim 12, wherein the first hydraulic line is formed at an exterior circumference of the ring gear between two ring gear bearings rotatably supporting an exterior circumference of a first end portion and an interior circumference of a second end portion of the ring gear on the transmission housing.

14. The transmission system of claim 12, wherein an input shaft bearing for rotatably supporting the rear end portion of the input shaft on the transmission housing is fluidly blocked from the second hydraulic line by a labyrinth seal interposed between the rear end portion of the input shaft and the transmission housing.

15. The transmission system of claim 12, wherein the third hydraulic line is formed at a position of the front cover corresponding to the intermediate shaft bearing rotatably supporting the front end portion of the intermediate shaft on the front cover.

16. The transmission system of claim 12, wherein the brake is disposed between a first hub connected to the first rotor of the first motor/generator and the transmission housing in a space in the transmission housing corresponding to an interior circumference of a first stator of the first motor/generator.

17. The transmission system of claim 12, wherein a parking gear is fixedly disposed on the intermediate shaft.

18. The transmission system of claim 12, wherein the planetary gear set, the two input gears and the two intermediate gears, the first motor/generator, and the second motor/generator are sequentially disposed from the engine rearward.

19. The transmission system of claim 12, wherein the second motor/generator is disposed at the rearmost in the transmission housing, the connecting shaft having an intermediate shaft hydraulic line formed therein is splined between a second hub connected to the second rotor and a rear end portion of the intermediate shaft, and lubrication oil is supplied to the first motor/generator through the intermediate shaft hydraulic line of the connecting shaft by centrifugal force.

20. The transmission system of claim 19, wherein a first hub connected to the first rotor of the first motor/generator is rotatably disposed on the connecting shaft.

* * * * *